United States Patent
Dorsey et al.

(10) Patent No.: US 9,477,998 B2
(45) Date of Patent: Oct. 25, 2016

(54) PERFORMANCE CONTROL FOR CONCURRENT ANIMATIONS

(71) Applicant: Apple Inc., Cupertino, CA (US)

(72) Inventors: John G. Dorsey, San Francisco, CA (US); Keith Cox, Campbell, CA (US); Cyril de la Cropte de Chanterac, San Francisco, CA (US); Karl D. Vulkan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 14/489,356

(22) Filed: Sep. 17, 2014

(65) Prior Publication Data

US 2015/0348223 A1  Dec. 3, 2015

Related U.S. Application Data

(60) Provisional application No. 62/006,225, filed on Jun. 1, 2014.

(51) Int. Cl.
| | |
|---|---|
| *G06T 15/00* | (2011.01) |
| *G06T 1/20* | (2006.01) |
| *G06T 13/80* | (2011.01) |
| *G09G 5/18* | (2006.01) |

(52) U.S. Cl.
CPC ............... *G06T 1/20* (2013.01); *G06T 13/80* (2013.01); *G09G 5/18* (2013.01); *G09G 2330/021* (2013.01)

(58) Field of Classification Search
CPC ........... G06T 1/20; G06T 13/80; G06T 1/60; G09G 2330/021; G09G 5/18
USPC ................................ 345/473, 474, 475
See application file for complete search history.

(56) References Cited

U.S. PATENT DOCUMENTS

| | | | | |
|---|---|---|---|---|
| 6,266,053 B1 * | 7/2001 | French | ............ | G06T 17/005 345/440 |
| 6,614,428 B1 * | 9/2003 | Lengyel | ............ | G06T 9/001 345/420 |
| 6,753,878 B1 * | 6/2004 | Heirich | ............ | G06T 15/005 345/619 |
| 7,511,718 B2 * | 3/2009 | Subramanian | ...... | G06F 9/545 345/473 |
| 8,321,806 B2 * | 11/2012 | Agrusa | ............ | G05B 23/0267 700/17 |
| 8,860,731 B1 * | 10/2014 | Cohen Bengio | ..... | G06T 13/00 345/419 |
| 9,076,259 B2 * | 7/2015 | Hourie | ............ | G06F 17/30241 |
| 9,082,196 B2 * | 7/2015 | Bakalash | ............ | G06T 15/005 |

* cited by examiner

*Primary Examiner* — Phu K Nguyen
(74) *Attorney, Agent, or Firm* — Downey Brand LLP (57) ABSTRACT

The embodiments set forth a technique for targeted scaling of the voltage and/or frequency of hardware components included in a mobile computing device. One embodiment involves independently analyzing the individual frame rates of each animation within a user interface (UI) of a mobile computing device instead of analyzing the frame rate of the UI as a whole. This can involve establishing, for each animation being displayed within the UI, a corresponding performance control pipeline that generates a control signal for scaling a performance mode of the hardware components (e.g., a Central Processing Unit (CPU)) included in the mobile computing device. In this manner, the control signals generated by the performance control pipelines can be aggregated to produce a control signal that causes a power management component to scale the performance mode(s) of the hardware components.

26 Claims, 8 Drawing Sheets

PERFORMANCE CONTROL FOR CONCURRENT ANIMATIONS

CROSS-REFERENCE TO RELATED APPLICATIONS

The present application claims the benefit of U.S. Provisional Application No. 62/006,225, entitled "PERFORMANCE CONTROL FOR CONCURRENT ANIMATIONS" filed Jun. 1, 2014, the content of which is incorporated herein by reference in its entirety for all purposes.

TECHNICAL FIELD

The present embodiments relate generally to power management in a mobile computing device. More particularly, the present embodiments relate to power management techniques that correlate to central processor unit (CPU) activity as well as animation activity within a user interface (UI) of the mobile computing device.

BACKGROUND

Conventional computing devices (e.g., desktop computers and laptop computers) typically implement algorithms directed to controlling the operating clock frequency and voltage of processors included therein, such as a CPU and a GPU. These algorithms are directed to monitoring the CPU/GPU for workloads that take more than a threshold amount of time to complete. Consider, for example, a time-intensive image processing workload that takes several minutes for a CPU/GPU to execute when the CPU/GPU are in a low-performance operating mode. In this example, the algorithms detect that the workload meets certain criteria (e.g., the threshold amount of time has passed or processor duty factor has exceeded a threshold) and cause the CPU/GPU to switch from a low-performance operating mode to a mid-performance or a high-performance operating mode so that the workload is completed sooner. These algorithms enable conventional computing devices to reduce power for short, bursty workloads while providing high performance for long-running compute tasks.

Recent years have shown a proliferation in the usage of mobile computing devices with performance characteristics, energy constraints and interactive user interfaces that are different from those of desktop/laptop computers, which affect the types of workloads users execute on mobile devices. More specifically, unlike traditional long-running pure-compute tasks, mobile applications instead emphasize interactive performance for visual scenarios such as web browsing, gaming and photography. Consequently, the aforementioned algorithms—which are directed to identifying and responding to complex, time-intensive workloads—are not as effective when implemented in mobile devices as the algorithms cannot accurately determine when the operating mode of the CPU/GPU should be modified.

SUMMARY

This paper describes various embodiments that relate to the operation of performance control pipelines within a mobile computing device. In contrast to conventional approaches, these performance control pipelines can operate based on feedback received from components included in the mobile computing device, such as a frame buffer that manages frames for a user interface (UI) that includes different animations. In particular, instead of focusing solely on the amount of time a workload spends executing on the CPU, the techniques presented herein involve independently analyzing the individual smoothness of the different animations displayed within the UI. Such independent analysis provides the benefit of preventing, for example, an unnecessary increase in CPU performance when two animations are running smoothly within the UI, but the aggregate of the two animations—i.e., the UI as a whole—appears to be erratic in nature. Conversely, such independent analysis provides the benefit of appropriately increasing the performance of the CPU when, for example, at least one of the two animations is not running smoothly within the UI, but the aggregate of the two animations appears to be smooth in nature. In this manner, the performance of the CPU is scaled at appropriate and meaningful times, which increases battery performance and overall user satisfaction.

One embodiment sets forth a method for scaling a performance mode of a processor included in a mobile computing device. The method includes the steps of (1) establishing a plurality of performance control pipelines, (2) receiving an indication of an animation layer, where the animation layer contributes to at least a portion of each frame of a plurality of frames to be produced within a frame buffer of the mobile computing device, and (3) in response to receiving the indication of the animation layer: (i) identifying, from the plurality of performance control pipelines, a performance control pipeline that corresponds to the animation layer, and (ii) routing the plurality of frames to the performance control pipeline.

Another embodiment sets forth a non-transitory computer readable storage medium configured to store instructions that, when executed by a processor included in a mobile computing device, cause the mobile computing device to carry out a series of steps. In particular, the steps include (1) receiving an indication of an animation layer, where the animation layer contributes to at least a portion of each frame of a plurality of frames to be produced within a frame buffer of the mobile computing device, and (2) in response to determining that there are no performance control pipelines to which the animation layer corresponds: (i) establishing a performance control pipeline that corresponds to the animation layer, and (ii) routing the plurality frames to the established performance control pipeline.

Yet another embodiment sets forth a mobile computing device that comprises a processor, a frame buffer, and a memory. Specifically, the memory stores instructions that, when executed by the processor, cause the processor to carry out steps that include receiving an indication of a plurality of animation layers, where each animation layer is associated with a different portion of each frame of a plurality of frames that are produced within the frame buffer. Each animation layer in the plurality of animation layers is analyzed such that when (i) the animation layer corresponds to a performance control pipeline, the performance control pipeline is identified, or (ii) when the animation layer does not correspond to a performance control pipeline, a performance control pipeline is established, and the animation layer is mapped to the performance control pipeline. Subsequently, the plurality of frames are routed to the performance control pipeline.

Other embodiments include a non-transitory computer readable medium storing instructions that, when executed by a processor, cause the processor to carry out any of the method steps described above. Further embodiments include a system that includes at least a processor and a memory storing instructions that, when executed by the processor, cause the processor to carry out any of the method steps described above. Yet other embodiments include a system having a management co-processor separate from the main CPU capable of, either in cooperation with or in place of the main CPU, carrying out any of the method steps described above.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments set forth herein are directed to scaling the voltage and/or frequency of hardware components, e.g., a CPU, included in a mobile computing device. In particular, the embodiments are directed to alleviating a variety of performance and energy efficiency issues that are often exhibited by mobile computing devices and that are not well-addressed by conventional power-management techniques. As set forth in greater detail below, the embodiments can alleviate these performance and energy efficiency issues by implementing techniques that focus on various aspects of how animations are displayed by mobile computing devices.

One approach for scaling hardware performance in correlation to the smoothness of a UI involve analyzing the frame rate of the UI as a whole. Although these approaches can provide considerable energy and performance benefits, there may be circumstances where these approaches may lead to power inefficiencies. For example, some mobile computing devices can concurrently display two or more applications, which contrasts typical mobile computing devices that display only a single application or context (i.e., a home screen) at a time. Moreover, some mobile computing devices are capable of running applications (e.g., games) in which two or more animations can concurrently be displayed. Unfortunately, and as set forth in greater detail below, analyzing the frame rate of the UI as a whole can lead to power and performance inefficiencies.

Consider, for example, a UI in which two separate animations are executing at different target frame rates. In this example, if the CPU is performing at a level that enables each of the animations to maintain their target frame rates and appear acceptable (i.e., smooth) to the user, but the overall UI frame rate appears to be erratic in nature (e.g., the frame rates of the individual animations are out of sync), then analysis of the frame rate of the UI as a whole may result in an unnecessary increase in the performance of the CPU, thereby wasting energy. Conversely, if the CPU is performing at a deficient level that prevents at least one of the two animations from maintaining its target frame rate (and appearing choppy to the user)—but the overall UI frame rate appears to be smooth in nature (e.g., the frame rates of the two animations are in sync), then analysis of the UI frame rate as a whole may result in maintenance of the CPU performance level (and not increasing the performance of the CPU to correct the choppiness), thereby degrading the overall user experience.

In view of the foregoing, various benefits can be achieved by independently analyzing the individual frame rates of each animation displayed within a UI of a mobile computing device instead of analyzing the frame rate of the UI as a whole. Specifically, this can involve establishing, for each animation being displayed within the UI, a corresponding performance control pipeline that generates a control signal that requests scaling a performance mode of one or more hardware components (e.g., the CPU) included in the mobile computing device. The control signals generated by the performance control pipelines can be aggregated by a monitor component, which may in turn to produce a control signal that scales the performance mode(s) of the one or more hardware components. In some instances, various benefits can be achieved by analyzing each animation using a performance control pipeline that is specific to that type of animation (e.g., video, graphics library (GL), system UI, etc.). Additionally, it is noted that the performance control pipelines can be generated and eliminated according to a variety of techniques—e.g., pre-loading a pool of performance control pipelines, establishing performance control pipelines on-demand as new animations are displayed or dormant animations become active, tearing down performance control pipelines when corresponding animations are dormant or completed, etc.—which may promote efficient usage of the memory and processing resources required to implement the performance control pipelines. Thus, the approaches set forth herein can provide the benefit of preserving the smoothness of each animation within the UI while achieving power savings.

To achieve the foregoing benefits, components within the mobile computing device may be programmed and configured to route information regarding each of the animation/video sources—referred to herein as animation layers—to respective and relevant performance control pipelines. In some instances, each animation layer may be tagged with a unique identifier to facilitate routing information regarding each animation layer to individual control pipelines. In some instances, each animation layer is tagged with a layer identifier (e.g., "Layer_1") that is unique to that specific animation layer. In some instances, each animation layer may be tagged with an application identifier (e.g., "App_1") that identifies an application generating the animation layer. In some instances, the layer identifier may also identify the application generating the information layer. For example, animation layers generated by a first application may have a first type of layer identifier (e.g., "AppA_1", "AppA_2"..."AppA_n") while animation layers generated by a second application may have a second type of layer identifiers (e.g., "AppB_1", AppB_2"..."AppB_n"). Each animation layer can additionally be tagged with a layer type identifier that identifies a particular type (e.g., "OpenGL") of the animation layer.

In this manner, information regarding the animation layers can be organized and properly routed as the information is passed through different software/hardware components of the mobile computing device. These can components include, for example, an animation services (AS) component that generates frame information using animation layers in response to graphics-related requests issued by the applications, (2) a GPU/frame buffer that produce frames in accordance with the frame information, (3) a monitor that implements the various performance control pipelines and produces one or more control signals for scaling performance modes of the hardware components included in the mobile computing device, and (4) a power management component that scales the performance modes of the hardware components in accordance with the produced control signals. The specific details of these components are described below in conjunction with FIGS. 1-4.

It should be appreciated that when multiple animations are displayed concurrently on a UI (e.g., via a screen, display, or the like), each frame may include information (e.g., pixel instructions) from each of the animation layers. As new frames are generated, the information from each animation layer may or may not change depending on whether the animation layer updates. When a performance control pipeline is described herein as monitoring frames generated by an animation layer, the performance control pipeline is monitoring frames that include new information generated by the animation layer. Accordingly, the frame rate for an animation layer is the rate at which the animation layer contributes new information to frames being generated for display. For example, if the UI is displaying frames at sixty (60) frames per second (FPS) while displaying a given animation layer, and the animation layer is updating information at thirty (30) FPS, then every other frame displayed by the UI will include updated information from the animation layer. Accordingly, even though the animation layer may be displayed during each frame (at sixty (60) FPS), it is only generating new frames every other frame at a frame rate of thirty (30) FPS. Additionally, since multiple animations layers may be contributing to each frame, and each animation layer may be updating at different rates, different animation layers may have different frame rates (that, in turn, may be the same as or different than the overall frame rate of the UI).

As noted above, the monitor can be configured to implement various performance control pipelines depending on the number and type of animation layers being displayed on the mobile computing device. For example, a performance control pipeline may be established for each animation layer. The type of performance control pipeline established for each animation layer may be dependent on the source and/or type of the animation layer. In some variations, the type of performance control pipeline assigned to an animation layer is based on the source of the animation layer (e.g., the type of control pipeline may be selected using an application identifier). In other variations, the type of performance control pipeline assigned to an animation layer is based on the type of the animation layer (e.g., the type of performance control pipeline may be selected using a layer type identifier). In some instances, the type of performance control pipeline may be assigned based on the source and the type of the animation layer (e.g., selected using both an application identifier and a layer type identifier).

Accordingly, described herein in conjunction with FIGS. 2A-2B, and 3A-3B are examples of performance control pipelines that may be assigned to animation layers. For example, FIG. 2A sets forth a technique for implementing a performance control pipeline that may be useful when assigned to an animation layer that is not associated with a specific target frame rate, e.g., inertial scrolling of content displayed within an application. Specifically, this performance control pipeline involves sampling a utilization rate of the CPU, as well as sampling a rate at which frames are being generated by the animation layer. If the performance control pipeline identifies a particular "window" in which (1) a significant change to the overall frame rate of the animation layer has occurred (e.g., a rate of change of the animation layer frame rate reaches or exceeds a threshold value), and (2) the utilization rate of the CPU satisfies a threshold, then the performance control pipeline can produce a control signal directed to increase the performance of the CPU to help maintain the overall smoothness of the animation layer.

Figure 2A:
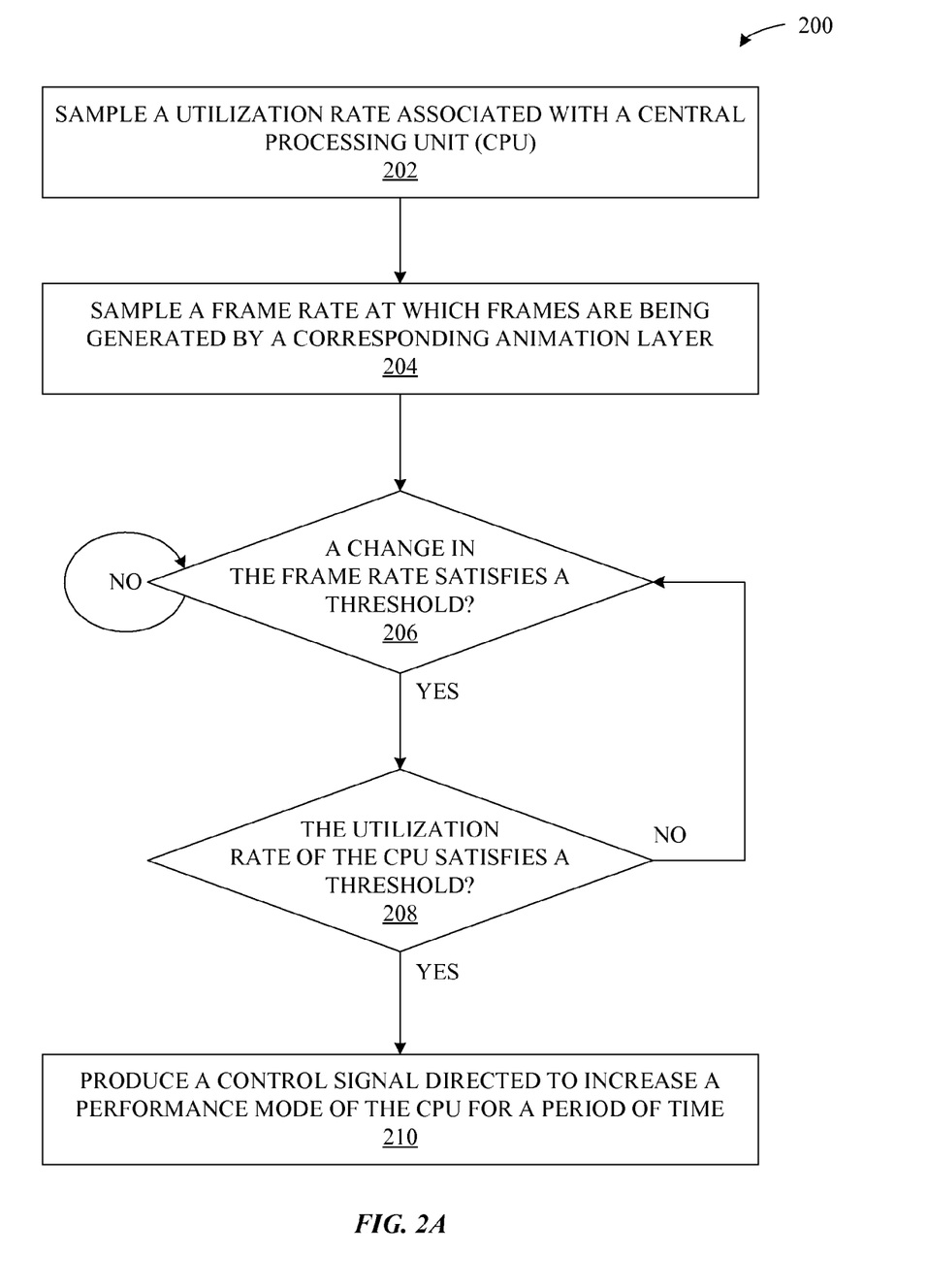
FIG. 2A illustrates a method for implementing a type of performance control pipeline that may be assigned to an animation layer that is not associated with a specific target frame rate, according to one embodiment.
Figure 2B:
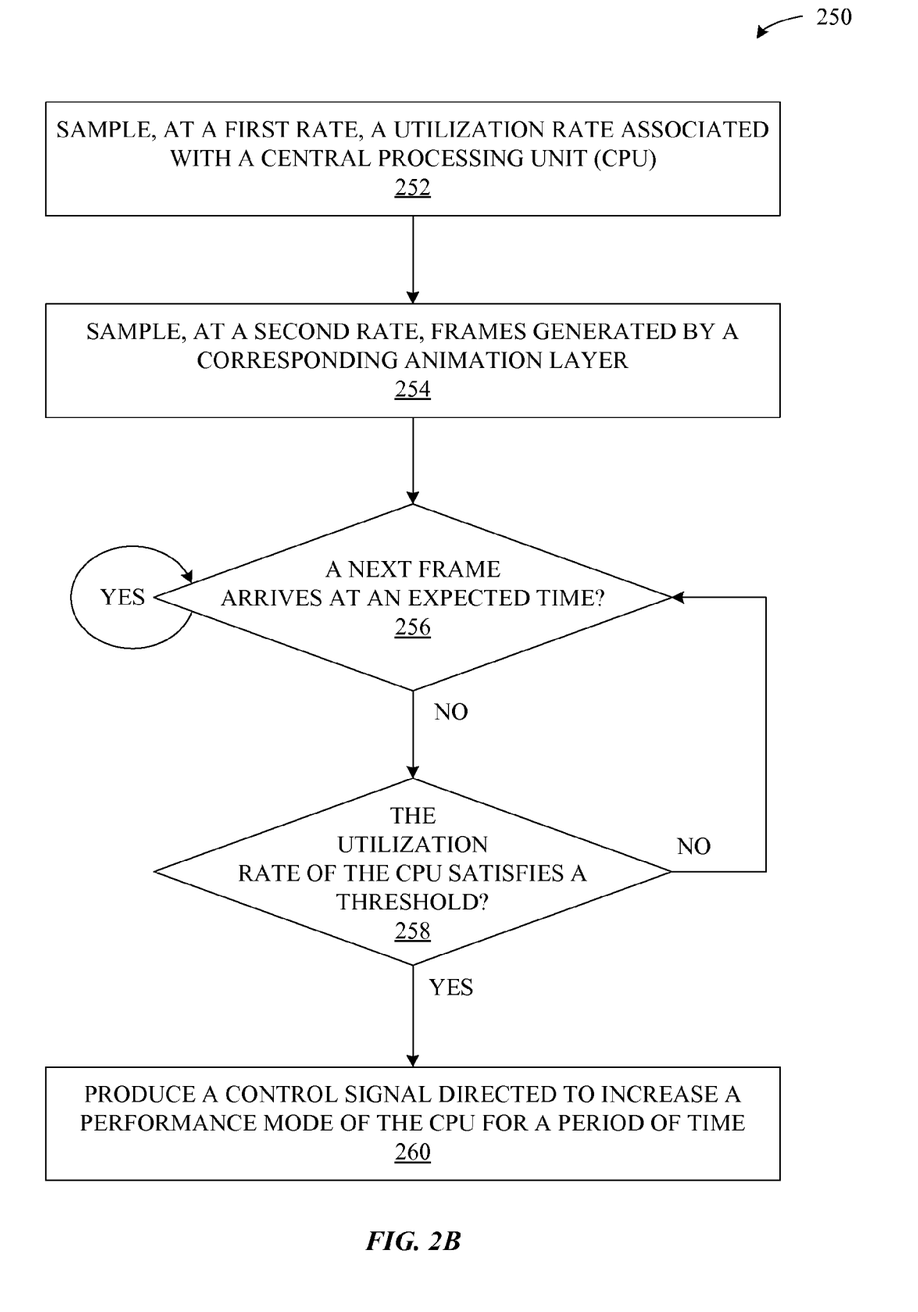
FIG. 2B illustrates a method for implementing a type of performance control pipeline that may be assigned to an animation layer that typically causes a sudden, significant change to an overall frame rate occurring at a mobile computing device, according to one embodiment.

FIG. 2B sets forth a technique for implementing a performance control pipeline that may be useful when assigned to an animation layer that typically causes a sudden, significant change to an overall frame rate occurring at the mobile computing device (e.g., an application launch animation, a web page rendering, etc.). Specifically, this performance control pipeline involves sampling a utilization rate of the CPU at a rate that exceeds a target frame rate of the animation layer. In some instances, the target frame rate may be based on the type and/or source of an animation layer. In other instances, the animation layer may be tagged with a target frame rate, which may be provided to the performance control pipeline. The performance control pipeline can identify an estimated time of arrival (ETA) for each frame generated by the animation layer, and, when a frame does not arrive as expected, the performance control pipeline can take action and produce an appropriate control signal. More specifically, the performance control pipeline can identify that if (1) a frame does not arrive on time, and (2) the utilization of the CPU satisfies a threshold, then the CPU is struggling to handle its current workload. When this occurs, the control signal generated by the performance control pipeline can cause the performance of the CPU to increase, which helps ensure that subsequent frames are produced and arrive on time.

Figure 3A:
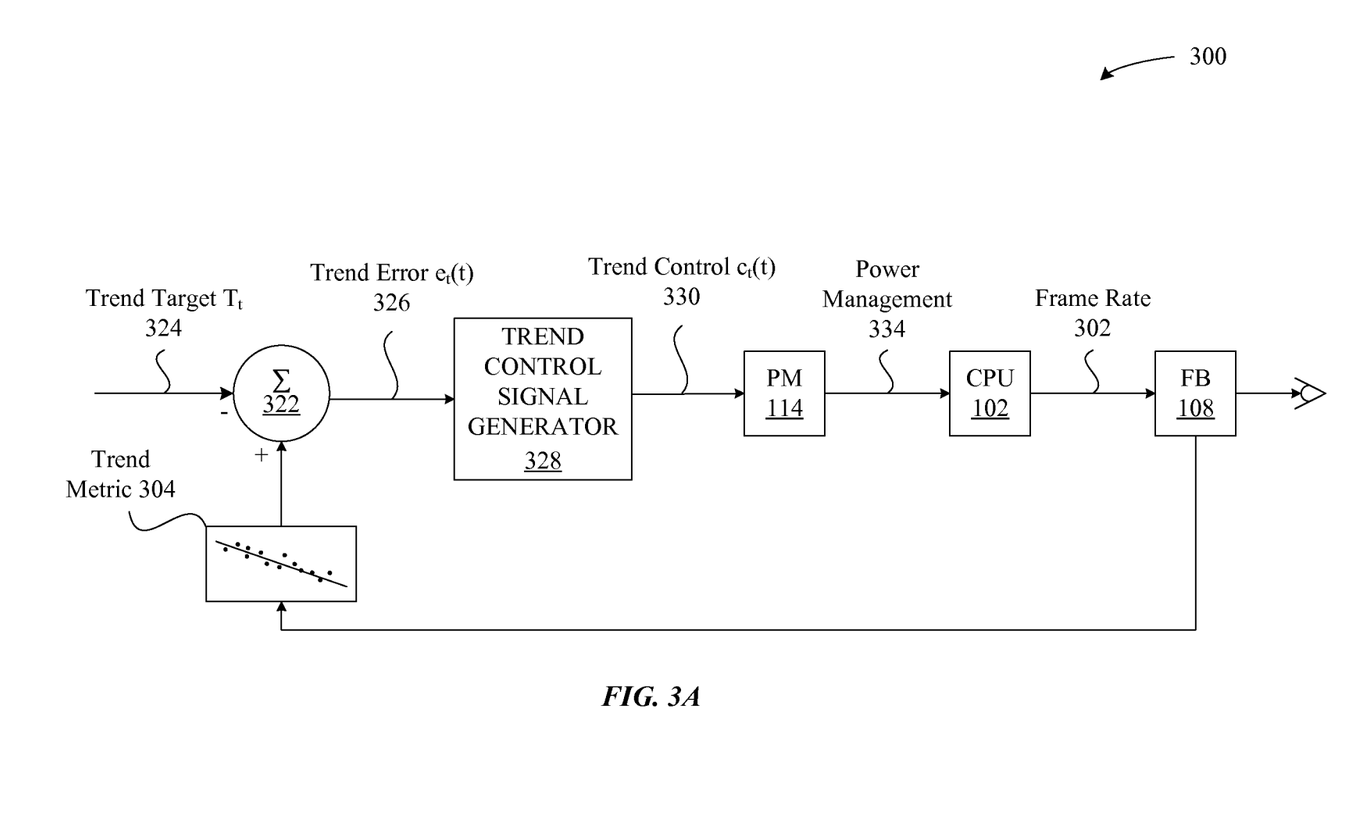
FIG. 3A illustrates a conceptual diagram of a performance control pipeline that is directed to scaling the voltage and/or frequency of a CPU based on a trend metric for the number of frames per second (NFPS) being input to a frame buffer in association with an animation layer, according to one embodiment.
Figure 3B:
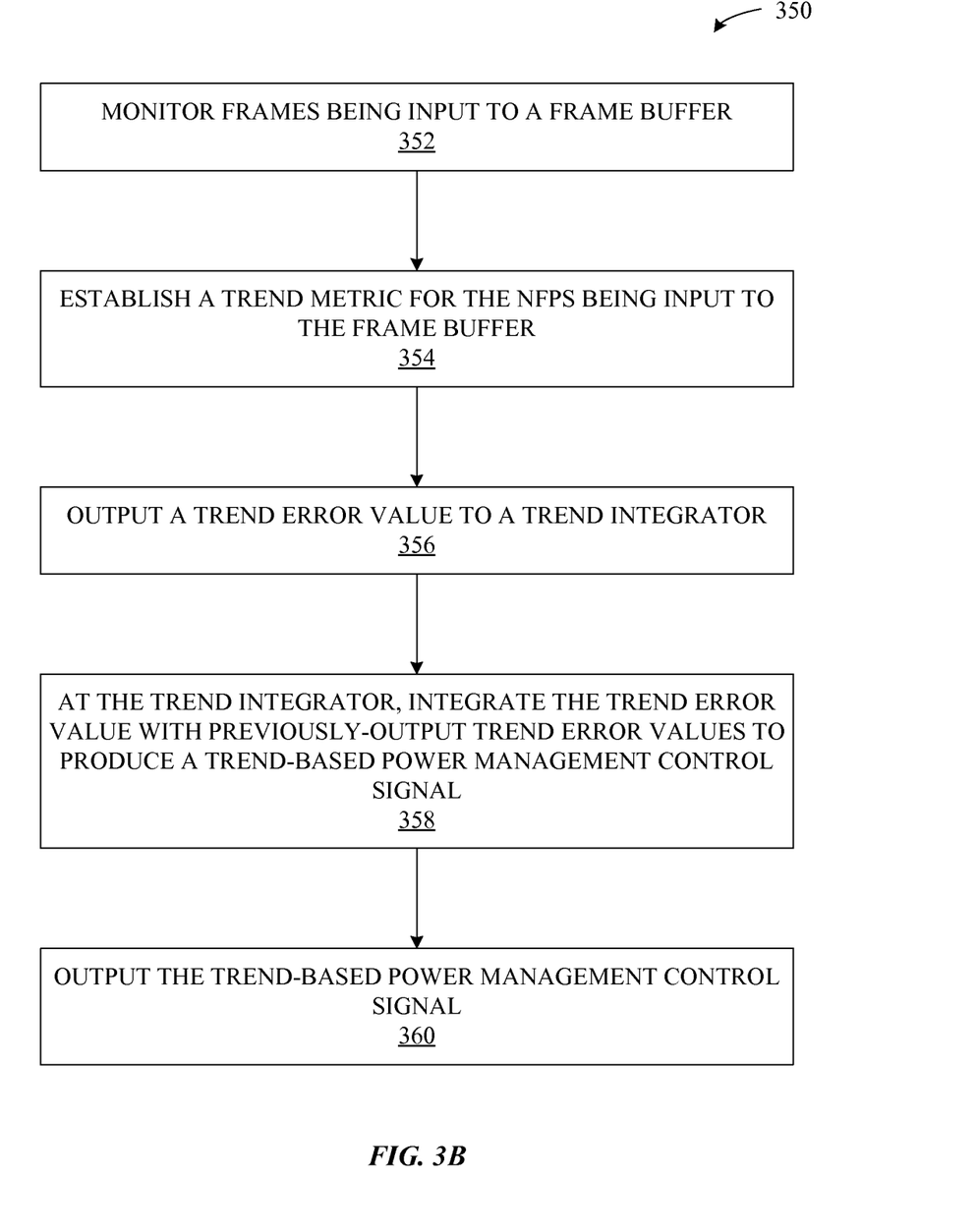
FIG. 3B illustrates a method for scaling the voltage and/or frequency of a CPU based on the NFPS being input to a frame buffer for an animation layer, according to one embodiment.

FIGS. 3A-3B set forth techniques for implementing a performance control pipeline that may be assigned to an animation layer having a target frame rate that should be maintained (e.g., OpenGL-based games). One example of such a performance control pipeline involves generating a control signal (that may be used to scale the voltage and/or frequency of the CPU) based on the number of frames per second (NFPS) being input to the frame buffer for a given animation layer in order to reduce or eliminate choppiness in the animation layer.

It is noted that the performance control pipelines set forth herein are merely exemplary. Specifically, the embodiments set forth herein can utilize any performance control pipeline that can be configured to produce control signals that are used to adjust the performance of components included in the mobile computing device, such as the various performance control pipelines set forth in application Ser. No. 13/913,307, filed on Jun. 7, 2014 and titled "CLOSED LOOP CPU PERFORMANCE CONTROL", the entire contents and disclosures of which are hereby incorporated by reference.

Generally, the performance control pipelines described herein may help to reduce the power usage of one or more processing components (e.g., a CPU) while helping to maintain a steady UI output. For example, the default operating mode of the CPU may be minimum performance, and increased performance is provided only to workloads that can benefit from such an increase. For example, by scaling the operating mode of the CPU when needed to provide individual animation smoothness, interactive applications that do not benefit from the higher CPU performance can save considerable amounts of energy relative to existing power management approaches. Moreover, tying specific types of animation layers to specific types of performance control pipelines can improve the overall accuracy by which the performance of the CPU is scaled, without compromising the user's overall experience. A detailed description of the embodiments is provided below in conjunction with FIGS. 1-4.

Figure 1A:
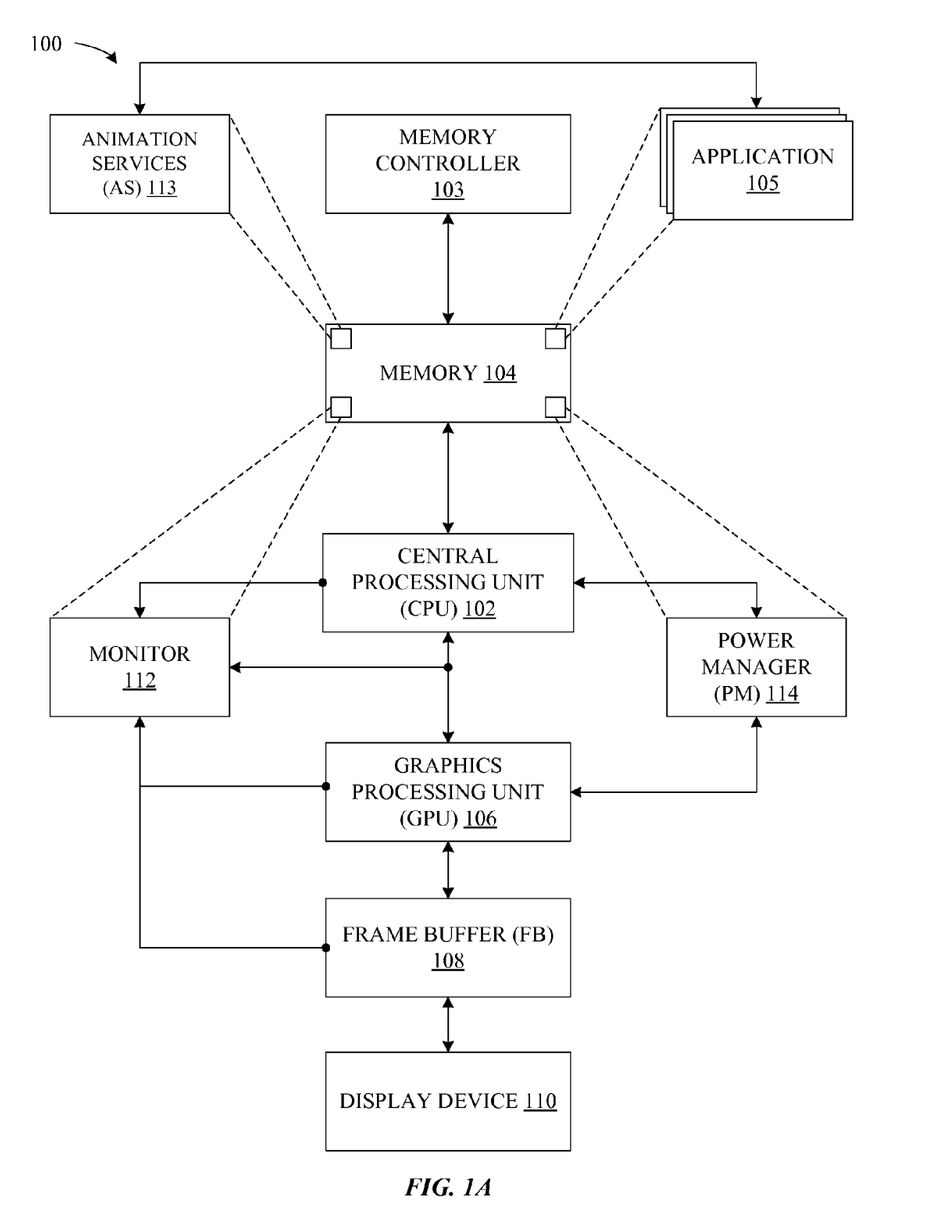
FIG. 1A illustrates a block diagram of a mobile computing device configured to implement the various techniques set forth herein, according to one embodiment.

FIG. 1A illustrates a block diagram of a mobile computing device 100 configured to implement the various techniques set forth herein, according to one embodiment. As shown in FIG. 1, mobile computing device 100 includes subsystems such as CPU 102, a memory controller 103, a system memory 104, GPU 106, frame buffer 108, and display device 110. As is well-known, CPU 102 generates and transmits instructions to GPU 106 for execution, where GPU 106 consumes the instructions at a rate that is influenced at least by the utilization rate of GPU 106 and a rate at which CPU 102 is generating and transmitting the instructions to GPU 106. Frame buffer 108 is configured to continually receive and store an updated sequence of frames that are eventually output to display device 110. Also shown in FIG. 1A are monitor 112 and power manager 114, which are loaded in system memory 104 and configured to execute on mobile computing device 100.

In one embodiment, system memory 104 includes both a DRAM subsystem (not illustrated) and a flash memory subsystem (not illustrated) that are managed by the memory controller 103. Although not illustrated in FIG. 1, each of monitor 112 and power manager 114 can run on an operating system (OS) that is configured to execute on mobile computing device 100. Additionally, monitor 112 and power manager 114 can run on a management co-processor (not illustrated) that is separate and distinct from the CPU 102. System memory 104 also includes animation services 113 and applications 105.

Animation services 113 can represent a graphics engine that is implemented by the OS and configured to process graphics requests generated by applications 105 (e.g., native OS applications and third party applications). Specifically, animation services 113 is configured to generate and manage animation layers in conjunction with the graphics requests from applications. In turn, the animation layers may be combined and translated by animation services 113 into frame instructions that are passed to GPU 106/frame buffer 108 to produce composite images that are displayed on display device 110. As described in greater detail below, animation services 113 may supplement the frame instructions with metadata that enables the monitor to identify which specific animation layers contribute to the changes that occur within each composite image that is produced. In turn, the monitor can utilize the metadata to facilitate analysis of each animation layer by its respective performance control pipeline.

More specifically, and as described in greater detail below, monitor 112 is configured to implement various performance control pipelines that are directed toward identifying circumstances where a change in the voltage and/or frequency of CPU 102 can benefit the overall performance and energy savings within mobile computing device 100. In particular, a performance control pipeline is instantiated for each active animation layer, and each performance control pipeline is configured to analyze frames that are produced in association with the animation layer. In turn, each performance control pipeline produces a control signal that is received by power manager 114, whereupon power manager 114 correspondingly scales the voltage and/or frequency of hardware components included in mobile computing device 100, e.g., CPU 102, GPU 106, and/or memory controller 103. For example, one control signal of a performance control pipeline can slowly increase (e.g., the utilization rate of GPU 106) and cause the power manager 114 to correspondingly increase the voltage and/or frequency of CPU 102.

In one embodiment, each performance control pipeline produces a control signal, the magnitude of which expresses a desire for a particular level of performance. For example, in some instances larger control signal values may correspond to requests for larger performance increases. When multiple animation layers are being displayed concurrently and respective control pipelines are analyzing the animation layers, each performance control pipeline may produce a control signal independently of the other performance control pipelines 170. The plurality of control signals may be used by the monitor to determine whether and how much the performance should be increased. According to one embodiment, the monitor 112 and/or power manager 114 may control the CPU 102 performance using the control signal that requests the largest performance increase (e.g., the control signal having the largest value, in instances where larger values correspond to larger performance increases). This may allow for the animation layer requiring the greatest CPU performance to receive the necessary performance increase. It should be appreciated that the monitor 112 may use the control signals of the performance control pipelines in other manners (e.g., selecting an average value of the control signals) in determining the performance increase.

Given a selected performance increase, the mapping to a CPU 102 performance configuration may vary. In one embodiment, a range of values for the control signal(s) may be linearly mapped to qualified CPU 102 frequencies. In a related embodiment, the mapping may instead be linear in CPU 102 voltage rather than frequency. In another embodiment, the mapping may involve the use of frequency/voltage dithering to produce a more precise mapping through pulse width modulation techniques. In yet another embodiment, the mapping may also determine the number of CPU 102 cores that may be concurrently active in a multi-core environment. For example, a lower control signal may restrict the CPU 102 to single-core operation as a means of conserving energy. In yet another embodiment, the mapping may also determine the selection of a primary core or secondary core, where the primary core is more powerful than the secondary core and is configured to operate during high demand periods, and where the secondary core is less powerful than the primary core and is configured to operate during low demand periods.

Figure 1B:
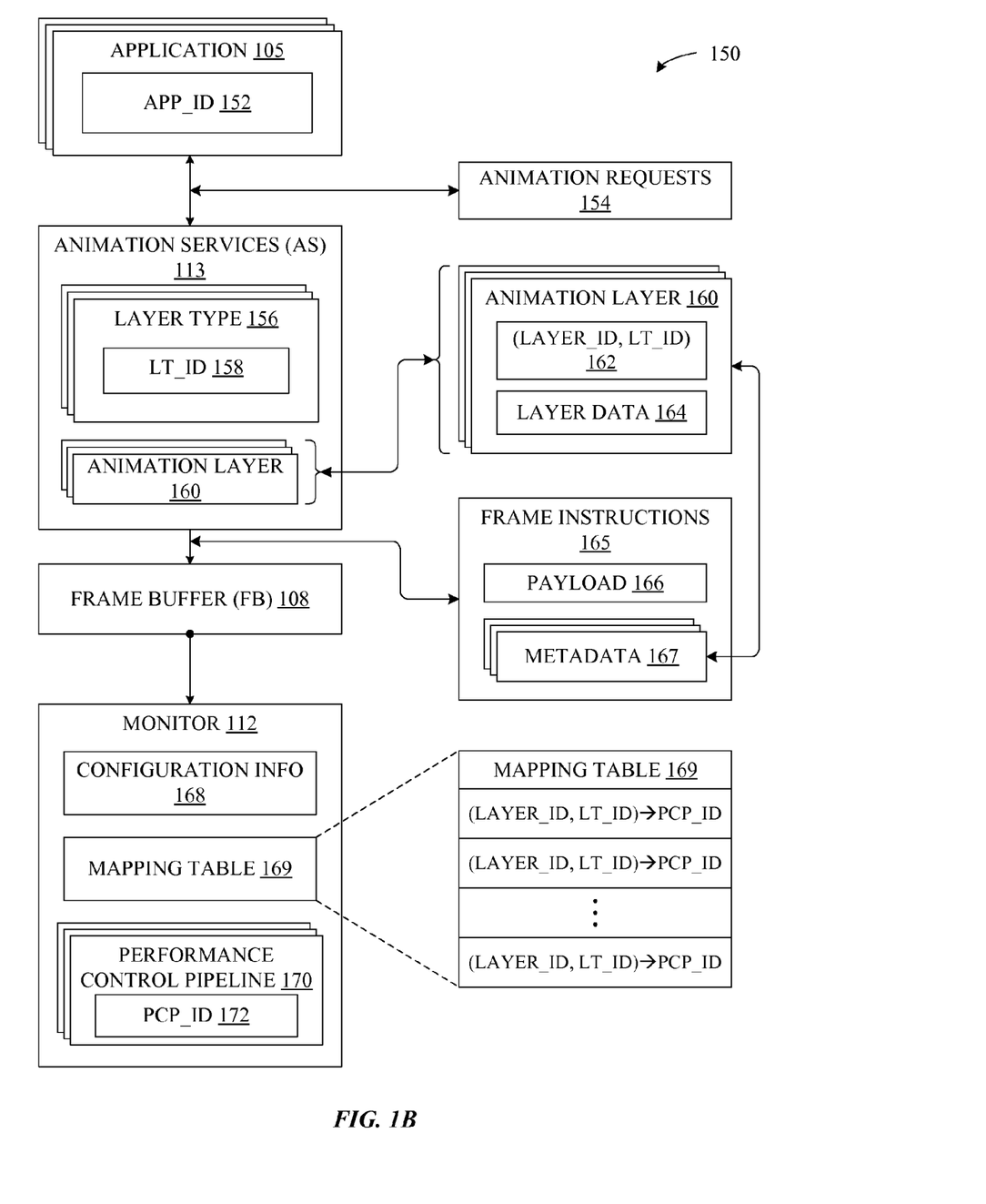
FIG. 1B illustrates a more detailed view of different components included in the mobile computing device of FIG. 1, according to one embodiment.

FIG. 1B illustrates a more detailed view 150 of different components included in the mobile computing device 100 of FIG. 1A, according to one embodiment. As shown in FIG. 1B, each application 105 can provide graphics requests (illustrated as animation requests 154) to animation services 113, which in turn creates animation layers 160 for each requested animation. In some instances, each application 105 may be associated with an identifier—App_ID 152—that uniquely identifies the application 105 and assists in enabling the monitor 112 to identify a source associated with each animation layer 160. Each animation layer 160 may be tagged with one or more identifiers such as those discussed above in greater detail. For example, in some instances, an animation layer 160 may be tagged with a layer identifier Layer_ID that is unique to the animation layer 160. In some instances, the Layer_ID may be the application identifier App_ID 152 modified to be unique to each animation layer 160 requested by a given application 105. In some variations, the animation layer 160 may also be tagged with the application identifier App_ID 152. Some or all of the information for the animation layer 160 tags may be provided by the animation requests 154. An animation request 154 can include, for example, the App_ID 152 of the application 105 that issues the animation request 154, as well as an indication of the nature of the graphics request (e.g., a video feed, an animation, a graphics library, etc.). In turn, animation services 113 can identify a particular layer type 156 that corresponds to the animation request 154, where each layer type 156 is associated with an identifier—LT_ID 158—that corresponds to the layer type 156. In instances where an animation layer 160 is tagged with a target frame rate (not shown), the frame rate may be provided in the animation requests 154, or may be calculated by animation services 113.

In response to the animation requests 154, animation services 113 generates animation layers 160, which, as shown in FIG. 1B, each includes a tuple 162 and layer data 164. Each tuple 162 defines at least a Layer_ID (e.g., a modified App_ID 152) for the respective animation layer 160. In some variations, tuple 162 may also include the App_ID 152 of the application 105 associated with the animation layer 160. In some embodiments, where extended functionality is desired, the tuple 162 can also include an LT_ID 158 that identifies a layer type 156 associated with the animation layer 160. Additionally or alternatively, the tuple 162 may include a target frame rate. The layer data 164 represents the primary information that comprises the animation layer 160, e.g., graphical objects utilized by animation services 113 to generate frame instructions 165, which are processed by the GPU 106 to generate a composite image (i.e., pixel data) that is displayed on display device 110. In particular, and as shown in FIG. 1B, the frame instructions 165 can include payload information 166 that is utilized by the GPU 106 (not shown in FIG. 1B) to generate the composite image, which, in turn, is provided to the frame buffer 108. The frame instructions can further include metadata 167, which includes information that identifies the particular animation layers 160 that are contributing to changes in each frame. This information can be identified, for example, by including within the metadata 167 a subset of tuples 162 that correspond to animation layers 160 that are contributing to the changes that are occurring across the composite images. For example, if no animation layers 160 contributed a change to a particular frame, the metadata 167 for that frame may not include any tuples 162. Conversely, if three animation layers 160 each contributed a changed to a particular frame, the metadata 167 for that frame may include a tuple 162 for each of the three animation layers 160.

In turn, the metadata 167 can be analyzed by the monitor 112 to manage various performance control pipelines 170 in accordance with the animation layers 160 that are relevant to the composite images being displayed on display device 110. More specifically, and as shown in FIG. 1B, the monitor 112 can be configured to manage the various performance control pipelines 170 in accordance with configuration information 168 and a mapping table 169. Specifically, the configuration information 168 can identify, for each animation layer 160, an individual and specific performance control pipeline 170 to which the animation layer 160 is mapped. As mentioned above, the selection of the type of performance control pipeline 170 assigned to a given animation layer 160 may be based on the application 105 requesting the animation layer 160, the type of animation layer 160, or a combination thereof. As shown in FIG. 1B, this can be achieved using PCP_ID 172 identifiers for uniquely identifying performance control pipelines 170 that are established and being managed by the monitor 112.

In some cases, it can be desirable for particular animation layers 160 to not be assigned to a performance control pipeline 170. For example, if an animation layer 160 represents a video feed that is most-efficiently processed by a dedicated hardware module included in the mobile computing device 100 (as opposed to the CPU 102/GPU 106), then the configuration information 168 can prevent the monitor 112 from routing the animation layer 160 to any performance control pipeline 170. When animation layers 160 are assigned to respective performance control pipelines 170, all of the animation layers 160 may use the same type of performance control pipelines 170, or specific animation layers 160 may be assigned to different types of performance control pipelines 170. For example, if an animation layer 160 should be processed by a particular type of a performance control pipeline 170—such as those described below in conjunction with FIGS. 2A-2B and 3A-3B, then the configuration information 168 can cause the monitor 112 to route the animation layer 160 to an instance of the particular type of the performance control pipeline 170. To implement such routing, the monitor 112 implements the mapping table 169, which, as shown in FIG. 1B, includes entries that correlate different animation layers 160 to different performance control pipelines 170. Specifically, each entry of the mapping table 169 stores the tuple 162 of an animation layer 160, and the identifier (PCP_ID 172) of the performance control pipeline 170 to which the animation layer 160 corresponds. In this manner, the monitor 112 can maintain an up-to-date mapping and effectively route animation layers 160 to their appropriate performance control pipelines 170.

Figure 1C:
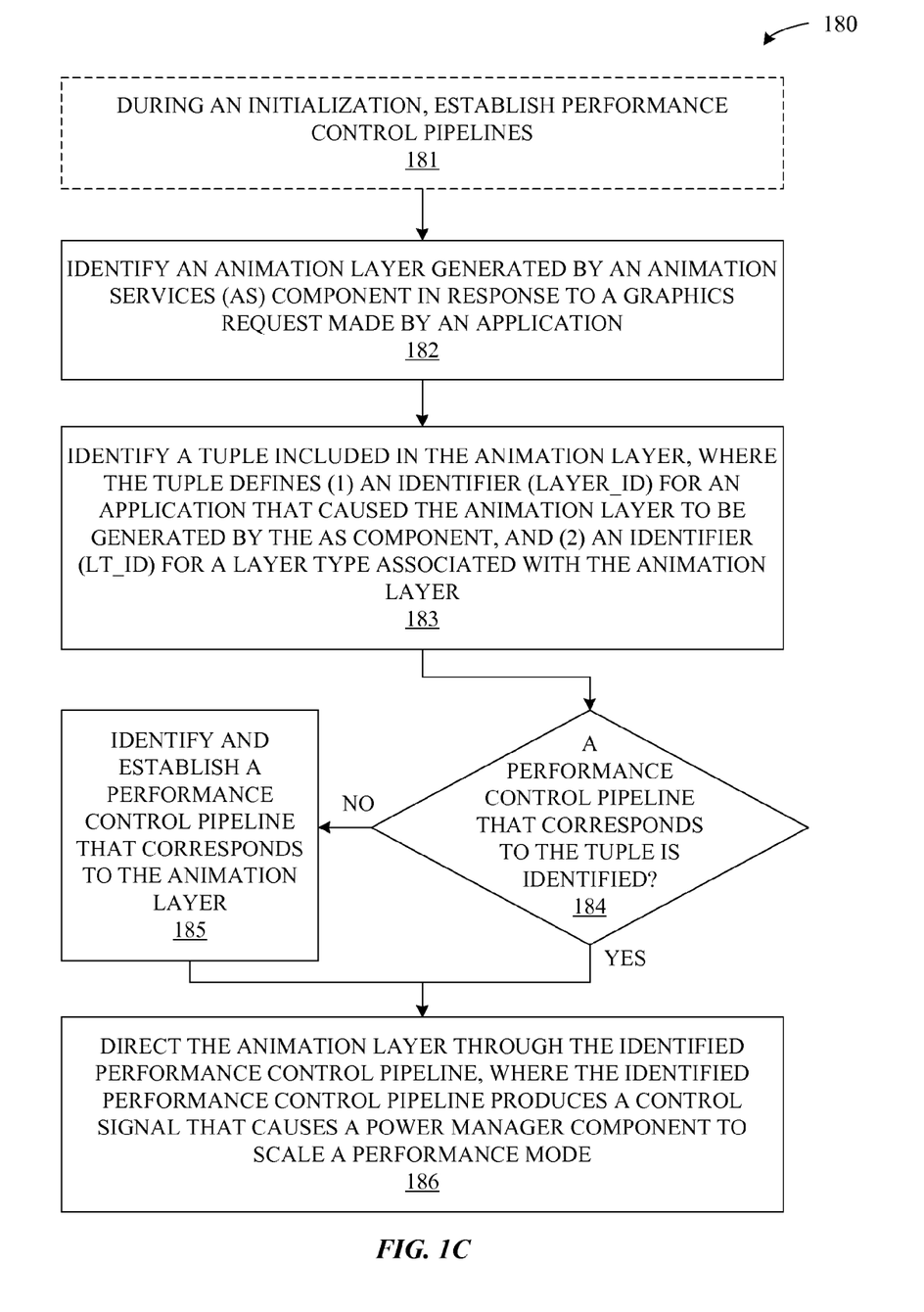
FIG. 1C illustrates a method for establishing performance control pipelines, as well as assigning the performance control pipelines to respective animation layers, according to one embodiment.

FIG. 1C illustrates a method 180 for establishing performance control pipelines 170, as well as assigning the performance control pipelines 170 to respective animation layers 160, according to one embodiment. As shown, the method 180 begins at step 181, where the monitor 112 optionally, during an initialization, pre-establishes performance control pipelines 170. These pre-established performance control pipelines 170 can correspond to animation layers 160 that are expected to frequently be generated by applications 105. In this manner, a reduction in the lag that otherwise might occur when generating performance control pipelines 170 on-demand (e.g., only when a new animation layer 160 is generated) can be achieved. At step 182, the monitor 112 identifies an animation layer 160 generated by animation services 113 in response to a graphics request (e.g., an animation request 154) made by an application 105. At step 183, the monitor 112 identifies a tuple 162 (e.g., included in metadata 167), where the tuple 162 defines (1) a layer identifier (e.g., Layer_ID) for a corresponding animation layer 160. In some instances, the tuple 162 identifies an application 105 (either via the layer identifier or a separate identifier) that caused the animation layer 160 to be generated by animation services 113. Additionally, the tuple 162 can define (2) an identifier (LT_ID 158) for a layer type 156 associated with the animation layer 160.

At step 184, the monitor 112 determines whether a performance control pipeline 170 that corresponds to the tuple 162 is identified (i.e., a performance control pipeline 170 for that animation layer 160 is already established). If, at step 184, the monitor 112 determines that a performance control pipeline 170 that corresponds to the tuple 162 is identified, then the method 180 proceeds to step 186, described below in greater detail. Otherwise, the method 180 proceeds to step 185, where the monitor 112 identifies and establishes a new performance control pipeline 170 that is assigned to the animation layer 160. At step 186, the monitor 112 directs information regarding the animation layer 160 through the identified performance control pipeline 170, where the identified performance control pipeline 170 produces a control signal that causes the power manager 114 to scale a performance mode of a hardware component included in the mobile computing device 100 (e.g., the CPU 102).

In addition, it is noted that the monitor 112 can be configured to tear down (i.e., eliminate) performance control pipelines 170 that correspond to animation layers 160 that no longer contribute to the composite image being displayed on display device 110 or are still part of the displayed composite image but are not providing updated information to the composite image. The monitor 112 can implement this functionality according to a variety of techniques. For example, in some instances, the monitor 112 may tear down a performance control pipeline 170 when the animation layer 160 assigned to the performance control pipeline 170 has not produced a new frame for a threshold amount of time (e.g., the monitor 112 identifies a threshold amount of time, such as 0.5 seconds or the like, without receiving a tuple 162 associated with the animation layer 160). This may be used to identify animation layers 160 that are no longer contributing to the displayed composite image (e.g., an application 105 has been closed) or that have been dormant for a threshold amount of time (e.g., the animation is being displayed but is not changing), and to tear down the performance control pipeline 170 associated with that animation layer 160. If the animation layer 160 ceases to be dormant (or is reintroduced into the composite image), a performance control pipeline 170 may reestablished for that animation layer 160. Additionally or alternatively, animation services 113 can be configured to populate metadata 167 with specific commands that cause the monitor 112 to eliminate specific performance control pipelines 170 (e.g., when a particular animation layer 160 has been eliminated). For example, when the monitor 112 receives these commands, the monitor 112 can eliminate the performance control pipeline 170 that corresponds to the particular animation layer 160. These techniques provide the advantage of promoting efficient usage of the memory and processing resources required to implement the performance control pipelines.

FIG. 2A illustrates a method 200 for implementing a type of performance control pipeline 170 that may be assigned to an animation layer 160 that is not associated with a specific target frame rate, according to one embodiment. As shown, the method 200 begins at step 202, where a performance control pipeline 170, upon being instantiated by the monitor 112, begins sampling a utilization rate associated with the CPU 102. At step 204, the performance control pipeline 170 samples a frame rate at which frames are being generated by the animation layer 160 that is assigned to the performance control pipeline 170 (e.g., by monitoring the rate at which tuples 162 associated with the animation layer 160 are received by the monitor 112). At step 206, the performance control pipeline 170 determines whether a change in the frame rate satisfies a threshold. If, at step 206, the performance control pipeline 170 determines that a change in the frame rate satisfies a threshold, then the method 200 proceeds to step 208, described below in greater detail. Otherwise, the method 200 repeats at step 206 until the performance control pipeline 170 determines that a change in the frame rate satisfies the threshold (or until the performance control pipeline 170 is torn down, such as described above).

At step 208, the performance control pipeline 170 determines whether the utilization rate of the CPU 102 satisfies a threshold. If, at step 208, the performance control pipeline 170 determines that the utilization rate of the CPU 102 satisfies the threshold, then the method 200 proceeds to step 210. Otherwise, the method 200 proceeds back to step 206. At step 210, the performance control pipeline 170 produces a control signal directed to increase a performance mode of the CPU 102 for a period of time. As previously noted herein, the produced control signal may be fed into the power manager 114, which can in turn scale the performance mode of the CPU 102. In other instances, a different control signal from a different performance control pipeline 170 may be fed to the power manager 114, but may still result in the performance increase requested by the produced control signal. In other instances, a control signal based on aggregated various control signals—including the produced control signal—may be being fed into the power manager 114.

FIG. 2B illustrates a method 250 for implementing a type of performance control pipeline 170 that may be assigned to an animation layer 160 that typically causes a sudden, significant change to an overall frame rate occurring at the mobile computing device 100, according to one embodiment. As shown, the method 250 begins at step 252, where a performance control pipeline 170 samples, at a first rate, a utilization rate associated with the CPU 102. At step 254, the performance control pipeline 170 samples, at a second rate, frames generated by an animation layer 160 that corresponds to the performance control pipeline 170. At step 256, the performance control pipeline 170 determines whether a next frame for that animation layer 160 arrives at an expected time (e.g., based on the receipt of a tuple 162 for that animation layer 160). If, at step 256, the performance control pipeline 170 determines that a next frame for that animation layer 160 arrives at the expected time, then the method 250 repeats at step 256. Otherwise, the method 250 proceeds to step 258.

At step 258, the performance control pipeline 170 determines whether the utilization rate of the CPU 102 satisfies a threshold. If, at step 258, the performance control pipeline 170 determines that the utilization rate of the CPU 102 satisfies the threshold, then the method 250 proceeds to step 260. Otherwise, the method 250 proceeds to back to step 256. At step 260, the performance control pipeline 170 produces a control signal directed to increase a performance mode of the CPU 102 for a period of time. As previously noted herein, the produced control signal may be fed into the power manager 114, which can in turn scale the performance mode of the CPU 102. In other instances, a different control signal from a different performance control pipeline 170 may be fed to the power manager 114, but may still result in the performance increase requested by the produced control signal. In other instances, a control signal based on aggregated various control signals—including the produced control signal—may be being fed into the power manager 114.

As noted above, one existing performance issue exhibited by the mobile computing device 100 can involve the smoothness of animation layers 160 shown on the display device 110. For example, choppy display of an animation layer 160 (e.g., a game not maintaining its target frame rate) contributes to a poor user experience and should be eliminated whenever possible. Accordingly, FIGS. 3A-3B illustrate conceptual and method diagrams for implementing a performance control pipeline 170 that may generate a control signal (which may be used to scale the voltage and/or frequency of the CPU 102) based on the number of frames-per-second (NFPS) being supplied to the frame buffer 108 by a particular animation layer 160 that is tied to the performance control pipeline 170. In particular, the performance control pipeline 170 is configured to measure a trend in the NFPS being input (in association with the animation layer 160) to the frame buffer 108 to determine whether the CPU 102 is operating at a power and/or frequency sufficient to smoothly display the animation layer 160. More specifically, when the performance control pipeline 170 observes changes in the NFPS, the performance control pipeline 170 produces a control signal that can request that the power manager 114 increase the voltage and/or frequency of the CPU 102 in order to smooth out the NFPS. Conversely, when the performance control pipeline 170 observes that the NFPS is stable, the performance control pipeline 170 can produce a control signal that requests that the power manager 114 decrease the voltage and/or frequency of the CPU 102 in order to conserve energy. When multiple control performance pipelines 170 are producing control signals, the power manager 114 may use one or more of the control signals to increase, decrease, or maintain the performance of the CPU.

FIG. 3A illustrates a conceptual diagram 300 of a performance control pipeline 170—specifically, an instance of a performance control pipeline 170—that is directed to scaling the voltage and/or frequency of the CPU 102 based on a trend metric for the NFPS being input to the frame buffer 108 in association with an animation layer 160, according to one embodiment. As shown in FIG. 3A, the NFPS being input to frame buffer 108 is represented by frame rate 302. Notably, the NFPS being input to frame buffer 108 is correlated to the smoothness of the animation layer 160 displayed on display device 110, which significantly impacts a user's overall experience. As shown in FIG. 3A, a trend metric 304 is configured to analyze changes in the NFPS being input to frame buffer 108 (in association with the animation layer 160). In one embodiment, the trend metric calculates a slope of a line fitted to the most recent frame rate samples using, for example, linear regression. The output of the trend metric 304 is then compared at a comparator 322 against a trend target $T_t$ 324 (e.g., one FPS), and a comparator 322 outputs a trend error $e_t(t)$ 326 to a trend control signal generator 328. The trend control signal generator 328 can be any form of a controller filter that is closed-loop stable. For example, in one embodiment, the trend control signal generator 328 can be an integrator that, in turn, integrates trend errors $e_t(t)$ 326 as they are output by the comparator 322, and outputs the trend control signal $c_t(t)$ 330. The trend control signal generator 328 can also be configured to apply a gain $K_t$ to the integrated trend errors $e_t(t)$ 326 in order to amplify the trend control signal $c_t(t)$ 330.

In turn, power manager 114 may scale the voltage and/or frequency of CPU 102 according to the control signal 334. Accordingly, the performance control pipeline 170 illustrated in FIG. 3A causes the power manager 114 to dynamically scale the performance of CPU 102 in order to reduce or eliminate choppiness in the NFPS being input to frame buffer 108, thereby providing energy savings and enhancing overall user experience. Notably, at some point, most animations stop. Accordingly, the embodiments incorporate a threshold amount of time after observing the last frame buffer 108 update (e.g., tens or hundreds of milliseconds). If no new update (i.e., frame) arrives in that time, the comparator 322 is reset (and, therefore, the control signal) to zero. As a result, shortly after an animation ends, the performance control pipeline 170 will cease to have an influence on the operating mode of CPU 102. In some instances, the performance control pipeline 170 may be torn down after the comparator 322 is reset.

FIG. 3B illustrates a method 350 for scaling the voltage and/or frequency of CPU 102 based on the NFPS being input to frame buffer 108 for an animation layer 160, according to one embodiment. Although the steps of method 350 are described in conjunction with FIGS. 1A and 3A, persons skilled in the art will understand that any system configured to perform the method steps, in any order, is within the scope of the embodiments. As shown in FIG. 3B, the method 350 begins at step 352, where a performance control pipeline 170 monitors frames being input to the frame buffer 108 for the animation layer 160. At step 354, the performance control pipeline 170 establishes a trend metric for the NFPS being input to the frame buffer 108 for the animation layer 160. Notably, steps 352-354 represent the trend metric 304 illustrated in FIG. 3A. At step 356, the performance control pipeline 170 outputs a trend error value to a trend integrator. Step 356 represents the comparator 322 of FIG. 3A processing the trend target $T_t$ 324 and the output of the trend metric 304 to produce the trend error $e_t(t)$ 326, which is fed into the trend control signal generator 328. At step 358, the performance control pipeline 170 integrates, at the trend integrator, the trend error value with previously-output trend error values to produce a trend-based control signal. Hence, step 358 represents the trend control signal generator 328 integrating trend errors $e_t(t)$ 326 as they are output by the comparator 322. Finally, at step 368, the performance control pipeline 170 outputs the trend-based control signal, which represents the trend control signal $c_t(t)$ 330 of FIG. 3A.

Figure 4:
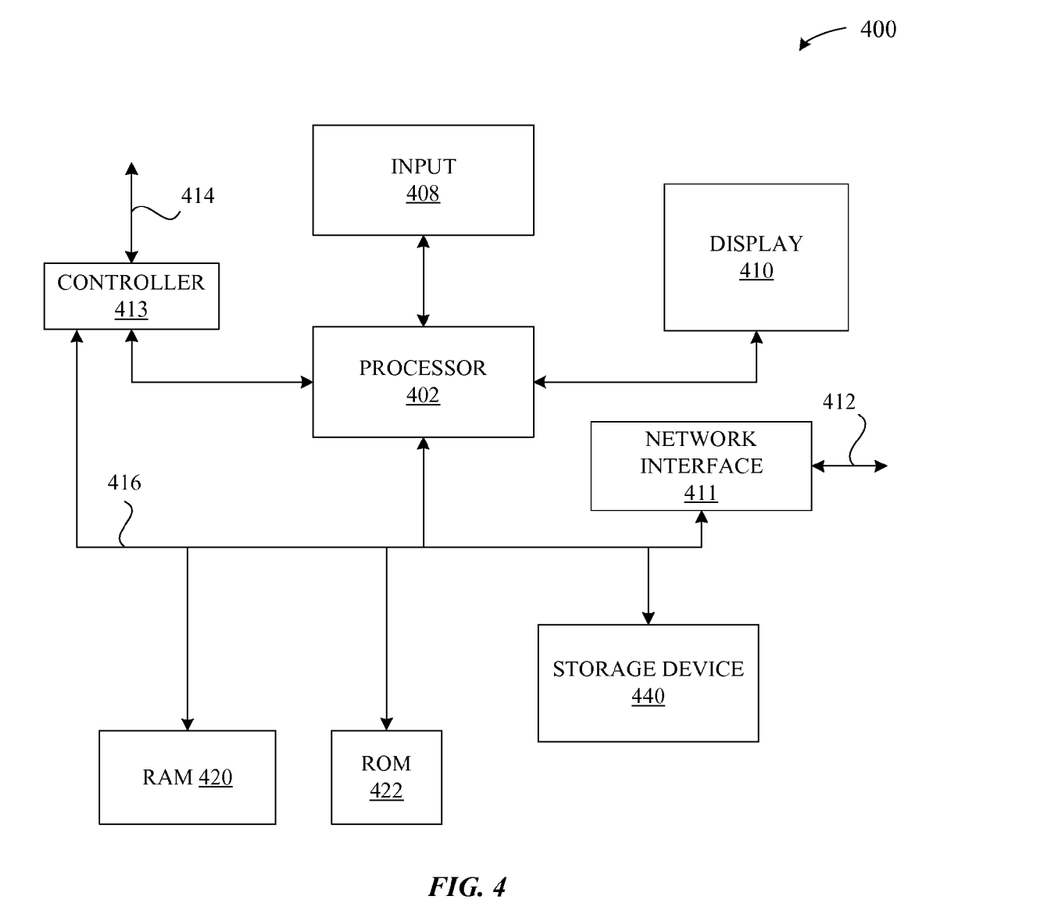
FIG. 4 illustrates a detailed view of a computing device that can be used to implement the various components described herein, according to some embodiments In the figures, elements referred to with the same or similar reference numerals include the same or similar structure, use, or procedure, as described in the first instance of occurrence of the reference numeral.

FIG. 4 illustrates a detailed view of a computing device 400 that can be used to implement the various components described herein, according to some embodiments. In particular, the detailed view illustrates various components that can be included in mobile computing device 100 illustrated in FIG. 1A. As shown in FIG. 4, computing device 400 can include a processor 402 that represents a microprocessor or controller for controlling the overall operation of computing device 400. The computing device 400 can also include a user input device 408 that allows a user of the computing device 400 to interact with the computing device 400. For example, user input device 408 can take a variety of forms, such as a button, keypad, dial, touch screen, audio input interface, visual/image capture input interface, input in the form of sensor data, etc. Still further, computing device 400 can include a display 410 (screen display) that can be controlled by processor 402 to display information to the user. A data bus 416 can facilitate data transfer between at least a storage device 440, processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

The computing device 400 also includes a storage device 440, which can comprise a single disk or a plurality of disks (e.g., hard drives), and includes a storage management module that manages one or more partitions within storage device 440. In some embodiments, storage device 440 can include flash memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400.

Although the foregoing embodiments have been described in detail by way of illustration and example for purposes of clarity and understanding, it will be recognized that the above described embodiments may be embodied in numerous other specific variations and embodiments without departing from the spirit or essential characteristics of the embodiments. Certain changes and modifications may be practiced, and it is understood that the embodiments are not to be limited by the foregoing details, but rather are to be defined by the scope of the appended claims.

What is claimed is:

1. A method for scaling a performance mode of a processor included in a mobile computing device, the method comprising:
    establishing a plurality of performance control pipelines;
    receiving an indication of an animation layer, wherein the animation layer contributes to at least a portion of each frame of a plurality of frames to be produced within a frame buffer of the mobile computing device; and
    in response to receiving the indication of the animation layer:
        identifying, from the plurality of performance control pipelines, a performance control pipeline that corresponds to the animation layer, and
        routing the plurality of frames to the performance control pipeline, wherein the performance control pipeline generates a control signal based on the plurality of frames, and the control signal causes the performance mode of the processor to be scaled.

2. The method of claim 1, wherein the animation layer is associated with a source identifier and a type identifier.

3. The method of claim 2, wherein the performance control pipeline is identified based on the type identifier.

4. The method of claim 2, further comprising:
    subsequent to identifying the performance control pipeline:
        adding an entry to a mapping table, wherein the entry indicates that a combination of the source identifier and the type identifier corresponds to the performance control pipeline.

5. The method of claim 1, further comprising:
    subsequent to identifying the performance control pipeline:
        receiving an indication of a different animation layer, wherein the different animation layer causes a different portion of each frame of the plurality of frames to be produced within the frame buffer; and
        in response to receiving the indication of the different animation layer:
            identifying, from the plurality of performance control pipelines, a particular performance control pipeline that corresponds to the different animation layer, wherein the particular performance control pipeline is different from the performance control pipeline, and
            routing the plurality of frames to the particular performance control pipeline.

6. The method of claim 1, wherein the performance control pipeline causes the performance mode of the processor to increase when:
    a next one of the frames of the plurality of frames is not received at an expected time, and
    a utilization of the processor satisfies a threshold.

7. The method of claim 1, wherein the performance control pipeline causes the performance mode of the processor to increase when:
    a change in a rate at which each frame of the plurality of frames is received satisfies a first threshold, and
    a utilization rate of the processor satisfies a second threshold.

8. A non-transitory computer readable storage medium configured to store instructions that, when executed by a processor included in a mobile computing device, cause the mobile computing device to carry out steps that include:

receiving an indication of an animation layer, wherein the animation layer contributes to at least a portion of each frame of a plurality of frames to be produced within a frame buffer of the mobile computing device; and in response to determining that there are no performance control pipelines to which the animation layer corresponds:

establishing a performance control pipeline that corresponds to the animation layer, and routing the plurality of frames to the performance control pipeline, wherein the performance control pipeline generates a control signal based on the plurality of frames, and the control signal causes a performance mode of the processor to be scaled.

9. The non-transitory computer readable storage medium of claim 8, wherein the animation layer is associated with a source identifier and a type identifier.

10. The non-transitory computer readable storage medium of claim 9, wherein the steps further include:

subsequent to establishing the performance control pipeline:

adding an entry to a mapping table, wherein the entry indicates that a combination of the source identifier and the type identifier corresponds to the performance control pipeline.

11. The non-transitory computer readable storage medium of claim 8, wherein the performance control pipeline causes the performance mode of the processor to increase when:

a next one of the frames of the plurality of frames is not received at an expected time, and a utilization of the processor satisfies a threshold.

12. The non-transitory computer readable storage medium of claim 8, wherein the performance control pipeline causes the performance mode of the processor to increase when:

a change in a rate at which each frame of the plurality of frames is received satisfies a first threshold, and a utilization rate of the processor satisfies a second threshold.

13. A mobile computing device, comprising:

a processor;

a frame buffer; and a memory storing instructions that, when executed by the processor, cause the processor to carry out steps that include:

receiving an indication of a plurality of animation layers, wherein each animation layer is associated with a different portion of each frame of a plurality of frames produced within the frame buffer;

for each animation layer in the plurality of animation layers:

when the animation layer corresponds to a performance control pipeline:

identifying the performance control pipeline; otherwise when the animation layer does not correspond to a performance control pipeline:

establishing a performance control pipeline, and mapping the animation layer to the performance control pipeline; and routing the plurality of frames to the performance control pipeline, wherein the performance control pipeline generates a control signal based on the plurality of frames, and the control signal causes a performance mode of the processor to be scaled.

14. The mobile computing device of claim 13, wherein each animation layer is associated with a source identifier and a type identifier.

15. The mobile computing device of claim 14, wherein mapping the animation layer to the performance control pipeline comprises:

adding an entry to a mapping table, wherein the entry indicates that a combination of the source identifier and the type identifier corresponds to the performance control pipeline.

16. The mobile computing device of claim 13, wherein the performance control pipeline causes the performance mode of the processor to increase when:

a next one of the frames of the plurality of frames is not received at an expected time, and a utilization of the processor satisfies a threshold.

17. The mobile computing device of claim 13, wherein the performance control pipeline causes the performance mode of the processor to increase when:

a change in a rate at which each frame of the plurality of frames is received satisfies a first threshold, and a utilization rate of the processor satisfies a second threshold.

18. A method for scaling a performance mode of a processor included in a mobile computing device, the method comprising:

generating a plurality of frames from a plurality of animation layers;

for each animation layer of the plurality of animation layers:

establishing a respective performance control pipeline;

for each frame of the plurality of frames:

determining frame information, wherein the frame information identifies one or more animation layers that provide updated information for the frame; and routing the frame information to the respective performance control pipelines, wherein the performance control pipeline generates a control signal based on the plurality of frames, and the control signal causes the performance mode of the processor to be scaled.

19. The method of claim 18, wherein each animation layer is associated with a layer identifier that is based on an application identifier associated with an application that corresponds to the animation layer.

20. The method of claim 19, wherein each animation layer is further associated with a type identifier that identifies a type of animation associated with the animation layer.

21. The method of claim 19, wherein a mapping table associates the layer identifier with a performance control pipeline identifier.

22. A method for scaling a performance mode of a processor included in a mobile computing device, the method comprising:

generating a plurality of composite frames from at least a first animation layer and a second animation layer;

establishing a first performance control pipeline assigned to the first animation layer and a second performance control pipeline assigned to the second animation layer;

determining:

a first frame rate of the first animation layer using the first performance control pipeline, and a second frame rate of the second animation layer using the second performance control pipeline; and routing a first control signal produced by the first performance control pipeline and a second control signal produced by the second performance control pipeline to cause the performance mode of the processor to be scaled based on an aggregate of the first control signal and the second control signal.

23. The method of claim 22, wherein:
the first frame rate of the first animation layer is a rate at which the plurality of composite frames include updated display information from the first animation layer, and
the second frame rate of the second animation layer is a rate at which the plurality of composite frames include updated information from the second animation layer.

24. The method of claim 22, wherein each animation layer is associated with a layer identifier that is based on an application identifier associated with an application that corresponds to the animation layer.

25. The method of claim 24, wherein each animation layer is further associated with a type identifier that identifies a type of animation associated with the animation layer.

26. The method of claim 24, wherein a mapping table associates the layer identifier with a performance control pipeline identifier.

* * * * *